July 13, 1965 W. F. ALLER 3,193,937

GAGING DEVICE

Filed Jan. 19, 1961

INVENTOR
WILLIS FAY ALLER

BY Edward J. Noig

HIS ATTORNEY

United States Patent Office 3,193,937
Patented July 13, 1965

3,193,937
GAGING DEVICE
Willis Fay Aller, Dayton, Ohio, assignor to The Sheffield Corporation, Dayton, Ohio, a corporation of Delaware
Filed Jan. 19, 1961, Ser. No. 83,675
3 Claims. (Cl. 33—169)

This invention relates to gaging devices, and more particularly to a gaging head suitable for the operation of gaging means.

One object of the invention is the provision of a gaging head provided with a work-contacting stylus arranged for substantially frictionless engagement with the part to be gaged and mounted to control a gaging means such as air orifice or an electrical transducer or the like.

Another object is the provision of a gage head of the character mentioned in which the end of the body that supports the working engaging stylus is tapered outwardly at opposite sides thereof so that the gage head may be effective in gaging a part where the axis of the gage head is at a comparatively wide angle to the part.

Another object is the provision of a gage head having the body that carries a ball forming a working engaging stylus, the ball being freely rotatable and operating against one end of a plunger, the other end of which controls a suitable gaging device.

Other objects and advantages of the invention will be apparent from the following description, the appended claims and the accompanying drawing, in which FIGURE 1 is a longitudinal section of a gaging head embodying the present invention;

Figure 1:
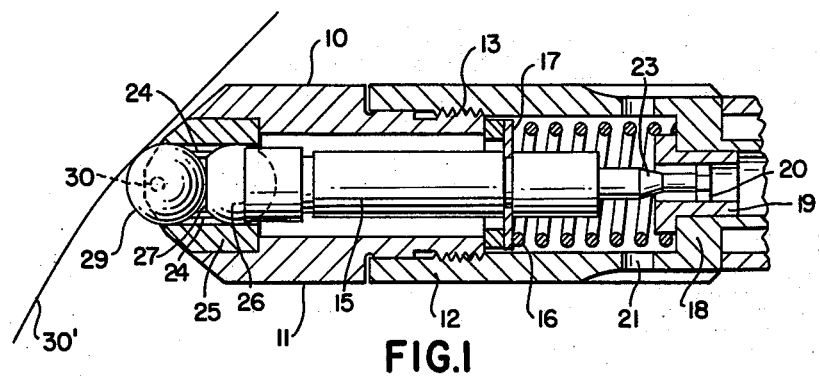

Referring more particularly to the drawing, the gage head, as shown in FIGURE 1, comprises an annular body 10, including the body portions 11 and 12, which are threaded together at 13. Within the body there is a slideably guided plunger 15 normally held towards the left by means of a spring 16 that engages at one end against a thrust washer 17 and at the other end against a flange 18 near one end of the body. Within this flange is an insert ring or sleeve 19. This sleeve slideably supports a scalloped disk 20 which is fixed on the end of the plunger 15, the disk 20 being accurately centered within the sleeve 19 and supporting one end of the plunger for free sliding movements. Air under pressure may be supplied to the end of the body so as to pass through the scalloped portions of the disk 20 and be relieved through the discharge opening 21 in the body. The control of the air flow takes place in accordance with the position of the tapered surface 23 on the plunger cooperating with the end of the sleeve 19. The maximum diameter of this tapered surface 23 is only very slightly less than the diameter of the hole in sleeve 19 and the closer the tapered surface 23 approaches the end of the sleeve, the greater will be the throttling effect on the flow of air. The air flow may be measured by a suitable gaging device, as indicated, for example, in the Aller Patent No. 2,831,257 granted April 22, 1958.

The other end of the plunger is a thrust portion slideably guided in a nose portion 25 of suitably hard material inserted in the end of the body portion 11. The end of the plunger which is contained in this nose portion is preferably of spherical contour where it is slideably engaged in the nose portion 25 to minimize the area of contact while permitting a minimum of radial clearance between the end of the plunger and its guide. This spherically formed bearing portion is indicated at 26. The cylindrical bore in the nose portion 25 may have longitudinal grooves 24 to further minimize the area of sliding contact.

The end of the thrust portion 26 is flattened as indicated at 27 and is in contact with a work-engaging ball stylus 29 of spherical shape and of suitable hard material. The ball 29 has only an operating clearance within the nose insert 25 and is retained in one limiting position by means of retaining members or pins 30 that are pressed in the nose portion 25. The ball 29, however, is freely rotatable and may be pressed back against the action of the spring-pressed plunger to control the gaging means at the other end of the body.

Figure 2:
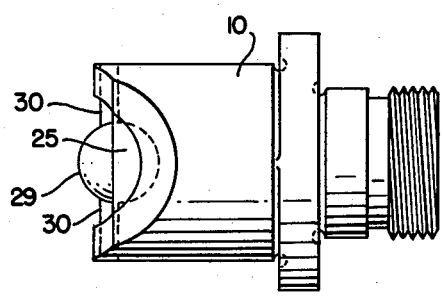
FIGURE 2 is a side elevation of the end of the gage head.

As will be apparent from FIGURES 1 and 2, the outer portion of the body at opposite sides thereof is inclined or tapered towards the ball, preferably at an angle of approximately 45°. As shown the end of the body is generally wedge-shaped, and since a large portion of the ball projects outwardly from the nose portion and the nose portion is substantially inclined at opposite sides thereof, the gaging head may be effective in gaging or tramming a surface shown at 30, even though the angle between the gaged part and the axis of the body is at a large angle of the order of 45°.

Figure 3:
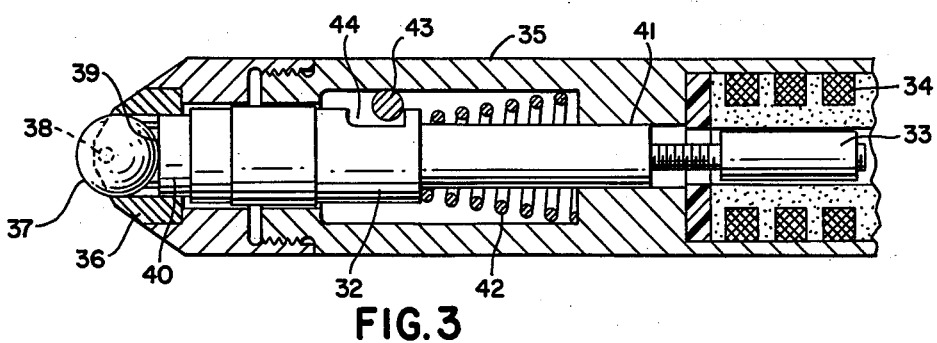
FIGURE 3 is a longitudinal central sectional view of a gage head of somewhat modified construction in which the gaging means controlled is an electrical transducer.

In the form of construction shown in FIGURE 1, the gaging means comprises an air orifice. However, this gaging means may be an electrical device of the general character disclosed in Patent No. 2,922,971 granted January 26, 1960. As shown in FIGURE 3, the plunger 32 at one end thereof carries an electrical winding 33 operating within a coil or coils 34 mounted in the rear end of the body 35. At the forward end of the body, there is a generally wedge-shaped insert 36 of hard wear resistant material slideably supporting the work-contacting ball 37 which is freely rotatable within the insert with only a limited very small clearance in the axial passage of the insert. Ball retaining pins 38 limit the outward travel of the ball. The ball contacts against a flat surface 39 on the plunger end 40 which is slideably guided with only limited clearance in the insert 36. The cylindrical bore in the insert 36 may be longitudinally grooved to minimize the contact area. The plunger may also be slideably guided within the body member at a point remote from the insert, as indicated at 41. A spring 42 normally presses the plunger towards the left, as viewed in FIGURE 3, and holds the ball stylus in its outermost position while permitting it to be moved inwardly by the work to control the position of the coil 33 with respect to the winding 34. A stop pin 43 held in the body 35 extends through a slotted portion 44 in the plunger to limit the inward movement of the plunger. As will be apparent in this form of construction, the nose portion of the gage head in which the work-engaging stylus is contained is outwardly tapered at opposite sides at a wide angle to the body axis and lies generally tangent to the ball, even though the ball is depressed slightly from its outermost position, and the gage head may be effective in gaging or tramming a part, even though the part is at an angle of about 45° to the workhead axis.

It will be apparent that the gage head is of comparatively simple construction, easily made, and is capable of very precise control of the gaging means, while providing substantially frictionless contact with the work.

While the forms of apparatus herein described constitute preferred embodiments of the invention, it is understood that the invention is not limited to these precise forms of apparatus, and that changes may be made therein without departing from the scope of the invention, as defined in the appended claims.

What is claimed is:

1. A gage head of the character described comprising a body, a plunger slidably guided in the body, gaging means operated by said plunger, a freely rotatable ball at one end of the body and projecting therefrom to act as a contact stylus, said ball being operatively engaged with one end of the plunger, the end of the body in which the ball is situated having a substantially wedged shape with the sides of the wedge lying substantially tangent to the ball, the apex of said wedge extending outward beyond the major ball diameter and including retaining means extending toward the ball surface within its major diameter at opposite sides thereof providing the sole retention against outward movement of said ball, guide means in the wedge-shaped end of the body including a cooperating cylindrical housing to prevent movement of said ball transverse to gaging movement and spring means in said body for urging the plunger toward the ball to normally hold the ball in its outer position against the ball retaining means.

2. A gage head of the character described comprising a body, a plunger slidably guided in the body, gaging means operated by said plunger, a freely rotatable ball at one end of the body and projecting therefrom to act as a contact stylus, said ball being operatively engaged with one end of the plunger, the end of the body in which the ball is situated at opposite sides thereof extending substantially tangent to the ball when the ball is in its outer most position, such sides tapering gradually from the points of substantial tangency back to the main portion of the body, a pair of diametrically opposed ball retaining pins in the outer end of the body projecting toward the ball beyond the major ball diameter and limiting outward movement of the ball with respect to the body, and spring means maintaining contact between the plunger and the ball during gaging operation.

3. A gage head of the character described comprising a body, a plunger slidably guided in the body, gaging means operated by said plunger, a freely rotatable ball at one end of the body and projecting therefrom to act as a contact stylus, said ball being operatively engaged with one end of the plunger, said body having inner surface guiding means exetnding in the gaging direction in which said ball is confined against movement transverse said direction, said guiding means at two opposite sides of said ball extending to and terminating substantially at the major diameter of said ball when in its extended position whereby said ball is only restrained against movement transverse the axis of plunger movement thereby, the outer surface of the end of the body in which the ball is situated at said two opposite sides thereof being reduced to a minimum transverse dimension and enlarging away from said end so that the ball can be effective in gaging a part when the angle of the part is substantially 45° from the axis of the body, a pair of diametrically opposed ball retaining means in the outer end of the body projecting toward the ball beyond the major ball diameter each respectively at a location between said two opposite sides of said ball and limiting outward movement of the ball with respect to the body, and yielding means maintaining contact between the plunger and the ball during gaging operation.

References Cited by the Examiner

UNITED STATES PATENTS

| 1,854,346 | 4/32 | Ostlind | 33—172 |
| 2,306,469 | 12/42 | Rupley. | |

FOREIGN PATENTS

| 533,874 | 12/54 | Belgium. |
| 95,391 | 1922 | Switzerland. |

ISAAC LISANN, *Primary Examiner.*

ROBERT L. EVANS, *Examiner.*